United States Patent [19]

Narimatsu et al.

[11] Patent Number: 4,560,560
[45] Date of Patent: Dec. 24, 1985

[54] METHOD OF MAKING CHEESE LIKE FOOD

[75] Inventors: Hiroki Narimatsu; Kenshi Sakamoto, both of Sennan; Tomoko Edayoshi, Izumisano; Hayato Kubota, Izumi, all of Japan

[73] Assignee: Fuji Oil Company, Limited, Osaka, Japan

[21] Appl. No.: 627,505

[22] Filed: Jul. 9, 1984

Related U.S. Application Data

[63] Continuation-in-part of Ser. No. 409,962, Aug. 20, 1982, abandoned.

[51] Int. Cl.$^4$ .............................................. A23C 19/02
[52] U.S. Cl. ...................................... 426/38; 426/40; 426/582
[58] Field of Search .................... 426/34, 36, 38, 40, 426/42, 580, 582, 585, 61

[56] References Cited

U.S. PATENT DOCUMENTS 1,676,138  7/1928  Epstein ................................. 426/585
3,873,729  3/1975  Kubota et al. ......................... 426/40

FOREIGN PATENT DOCUMENTS 0115136  7/1982  Japan .................................... 426/582

OTHER PUBLICATIONS

Reed, G., Industrial Microbiology, 4th Ed., Prescott & Dunn, AVI Publ. Co. Inc., Westport, CT, 1982, p. 70.

*Primary Examiner*—Steven Weinstein
*Assistant Examiner*—Marianne M. Cintins
*Attorney, Agent, or Firm*—Wenderoth, Lind & Ponack

[57] ABSTRACT

A method of making cheese-like food by mixing a proteinaceous component and a fat or oil component, curdling the resulting mixture with a microorganism and/or an enzyme to form a curd, cooking the curd to separate the whey, draining the whey, adding salt, and then working up the resulting material without or with a ripening step for a short period of time is disclosed. The improvement resides in using a fat or oil component selected from the group consisting of rapeseed oil; a mixture of rapeseed oil in combination with one or more oils such as laurin fats or oils and other edible oils such as soybean oil; a mixture of rapeseed oil and said other edible oil, or a mixture of said laurin fat or oil and said other edible oil; said fat or oil having a solid fat index determined by a pulse nuclear magnetic resonance method of 20 to 55 at 10° C., 10 to 45 at 20° C., or less at 30° C. and 10 or less at 35° C.

7 Claims, No Drawings

METHOD OF MAKING CHEESE LIKE FOOD

This application is a continuation-in-part of application Ser. No. 409,962, filed Aug. 20, 1982, now abandoned.

The present invention relates to a method of making cheese-like food. More particularly, according to the method of the present invention, a cheese-like food of an unripened type or a substantially unripened type cheese-like food of a short ripening period can be obtained by using a certain fat or oil, which cheese-like food has an excellent flavor.

It has been said that there are over 400 varieties of natural cheeses each of which has its own specific body and flavor. According to methods of making cheese, these natural cheeses are generally divided into ripened cheeses and unripened cheeses. Ripened cheeses include Limburger cheese, Roquefort cheese, Cheddar cheese and the like. Unripened cheeses include Cottage cheese, Baker's cheese, Cream cheese, Neufchatel cheese and the like.

In addition to conventional natural cheeses, various methods of making cheese-like food have been developed. The term "cheese-like food" used herein means so-called "imitation cheese" which is made from a mixture of a proteinaceous component (e.g. milk, skimmed milk, etc.) and a fat or oil component by utilizing action of a microorganism and/or an enzyme according to a similar method of making natural cheese. Almost all of the known methods of making cheese-like food are concerned with those of ripened types.

In a ripened type cheese-like food, it is considered that a microorganism or an enzyme acts on a mixture of a proteinaceous component and a fat or oil component during the ripening step to produce a favorable flavor.

However, in general, with respect to the production of flavor of a cheese-like food, fat or oil components have been insufficiently studied in comparison with proteinaceous components. That is, although the effect of a fatty acid composition in a fat or oil component on the production of flavor has hitherto been studied to some extent, the effects of the difference in kind of fats or oils to be used as the component has been hardly studied. For example, Japanese Patent Publication No. 21229/1965 discloses a method of making cheese-like food which is characterized by using a fat or oil having a specific solid fat index which contains tri-saturated glycerides and similar glycerides containing trans-unsaturated fatty acids in a total amount of 1% or less and has the fatty acid composition of 9 mole % or less of fatty acids having 3 or more unsaturated bonds and 3 mole % or less of fatty acids having 8 or less carbon atoms. However, according to this disclosure, in so far as the above conditions are satisfied, any kind of fat or oil may be used. The only exception is that, when a fat or oil containing lower fatty acids having 8 or less carbon atoms such as milk fat, coconut oil or palm kernel oil is used, the lower fatty acids should be removed to satisfy the above conditions.

The present inventors have intensively studied means of making a cheese-like food of an unripened type or a substantially unripened cheese-like food which is aged or ripened for a short period of time and which ripening period substantially produces an unripened cheese. Thus, the term "unripened cheese" means a cheese which has not been ripened at all or one which has been aged for a short period of time, i.e. up to 72 hours, so that it falls into the unripened cheese category. As the result, it has been surprisingly found that the kind of a fat or oil to be used has a great influence on flavor of a cheese-like food and excellent flavor can be produced by using a certain fat or oil.

The main object of the present invention is to provide a method of making cheese-like food of an unripened type having a short ripening period and which possesses excellent flavor. This object, as well as other objects and advantages of the present invention will become apparent to those skilled in the art from the following description.

According to the method of the present invention, a cheese-like food is made by mixing a proteinaceous component and a fat or oil component, curdling the resulting mixture with a microorganism and/or an enzyme to form a curd, cooking the curd to separate whey, draining the whey, adding salt, and then, optionally, ripening the resulting material for a short period of time.

Examples of the proteinaceous component are those commonly used in cheese-like food making such as whole milk, skimmed milk, whole milk powder, skimmed milk powder and a mixture thereof. In general, the proteinaceous component is mixed with the fat or oil component in an amount of from 3.0 to 4.0% by weight based on the total mixture.

The present invention is characterized by using a specific fat or oil as the fat or oil component. The fat or oil is a member selected from the group consisting of rapeseed oil; a mixture of rapeseed oil and one or a plurality of other fats or oils selected from the group consisting of laurin fats or oils and other edible fats or oils; and a mixture of one or a plurality of laurin fats or oils and one or a plurality of other edible fats or oils. The fat or oil should have a solid fat index determined by a pulse nuclear magnetic resonance method (hereinafter referred to as pulse NMR) of 20 to 55 at 10° C., 10 to 45 at 20° C., 25 or less at 30° C. and 10 or less at 35° C. The term "solid fat index" used herein means a solid fat content (%) at each temperature.

The most preferred fat or oil to be used in the present invention is rapeseed oil or a mixture of rapeseed oil and one or a plurality of other fats or oils selected from the group consisting of laurin fats or oils (e.g. coconut oil, palm kernel oil, babassu oil, etc.) and other edible fats or oils (e.g. soy bean oil, palm oil, tallow, lard, sheep fat, fish oil, whale oil, linseed oil, peanut oil, rice bran oil, safflower oil, sunflower oil, cottonseed oil, kapok oil, olive oil, shea butter, sal fat, illipe butter, etc.). Particularly, rapeseed oil alone or a mixture of rapeseed oil and one or a plurality of coconut oil, soy bean oil, palm oil and tallow is preferred. Although it is unclear why rapeseed oil provides a favorable effect to flavor of a cheese-like food, it is noteworthy that rapeseed oil is unique in comparison with other fats or oils since it contains a small amount of sulfur. For example, after degumming, crude rapeseed oil contains about 14 ppm of sulfur and even refined rapeseed oil contains 4 to 6 ppm of sulfur. Therefore, it is presumable that sulfur contained in rapeseed oil may provide some favorable effect to flavor. However, since the proteinaceous component also contains a substantial amount of sulfur, this can not absolutely be concluded. In any case, a cheese-like food having excellent flavor is obtained by using rapeseed oil alone or a mixture of fats or oils containing rapeseed oil in an amount of 30% by weight or more, preferably, 50% by weight or more (provided that the content of the laurin fat or oil is 50% by weight or less) based on the mixture.

Another preferred fat or oil used in the present invention is a mixture of one or a plurality of laurin fats or oils and the above other edible fats or oils. The laurin fat or oil is preferably present in the mixture in an amount of 5 to 50% by weight, more preferably, 10 to 30% by weight based on the mixture. When the amount of the laurin fat or oil exceeds the upper limit, flavor of the resulting cheese-like food tends to become inferior and further, body thereof tends to be crumbled to pieces. Although it may be considered that the fatty acid composition of the laurin fat or oil has effect on flavor of the cheese-like food of the present invention since the fat or oil contains lower fatty acids, it is believed that the important thing is the kind of the laurin fat or oil itself rather than the fatty acid composition thereof since the method of the present invention does not include any ripening step or, even if the step is included, the ripening period is very short. That is, in a ripening step, hydrolyzation of glycerides occurs to form fatty acids and therefore the fatty acid composition has important effect on flavor, whereas, in the present invention, hydrolyzation of glycerides is not essential. That is, the fatty acids and oils are essentially unmodified in the process of the present invention, unlike ripened cheese, and thus the unmodified fatty acids and oils themselves contribute to the flavor of the product. It is also noteworthy that, in the above Japanese Patent Publication No. 21229/1965, lower fatty acids should be removed from a fat or oil to be used, whereas, in the present invention, the laurin fat or oil is present in the mixture in an amount of 5 to 50% by weight.

In order to provide desired mouth feel and body to the cheese-like food of the present invention, the fat or oil to be used should have a solid fat index determined by pulse NMR of 20 to 55 at 10° C., 10 to 45 at 20° C., 25 or less at 30° C. and 10 or less at 35° C. This solid fat index can be attained by appropriately subjecting the fat or oil to a conventional treatment such as hydrogenation, solvent fractionation or interesterification. The pulse NMR determination can be carried out, for example, by using SOLID FAT CONTENT ANALYZER MODEL SFC-900 (manufactured by PRAXIS Corp. in U.S.A.) under the following conditions:

Magnet strength: 15 kG,gauss
Ratio frequency: 10.72 MHz
Pulse function: 90° C.
Display: Free Induction Decay (FID)
Clock: 1 sec.
Variable delay: 200 μsec.
Program counter: 8

In the method of the present invention, curd formation can be carried out by using a microorganism such as *Streptococcus cremoris, Streptococcus diacetylactis, Streptococcus lactis, Streptococcus thermophilus,* or *Betacoccus cremoris* and/or an enzyme such as rennin enzyme according to a conventional method. In view of flavor of the resulting cheese-like food, preferably, both the microorganism and the enzyme are used.

A drain of the whey and salt addition can be carried out according to a conventional method.

A ripening step is not essential in the method of the present invention. However, a ripening step may be incorporated into the method of the present invention. The ripening step can be carried out according to a conventional method at 0° to 15° C. for a short period of time such as 24 to 72 hours, preferably, 36 to 48 hours. The cheese thus-produced is aged for such a relatively short time that it can be properly denominated an unripened cheese. Further, the unripened cheese of the present invention is ordinarily pasteurized.

Additives such as lecithin and stabilizers (e.g. locust bean gum, guar gum, xanthan gum, carrageenan, etc.), can be used in the present invention according to a conventional method.

The unripened cheese-like food obtained by the method of the present invention can be consumed as it is or can be used as a material for making various kinds of confections. For example, the cheese-like food of the present invention shows excellent spreadability when it is spread on bread. Further, when the cheese-like food of the present invention is used in cheese cake making, a cheese cake having excellent flavor and texture can be obtained.

The following examples further illustrate the present invention in detail but are not to be construed to limit the scope thereof. In the examples, all the "parts" are by weight unless otherwise stated.

EXAMPLE 1

A mixed hardened oil having a melting point of 30.4° C. was prepared as follows:

Rapeseed oil (80 parts) was mixed with a low melting point fraction of palm oil having Iodine Value (I.V.) of 67.2 (20 parts) and the mixture was hydrogenated according to a standard method to obtain a hardened oil having I.V. of 72.0 and the melting point of 30.4° C. The hardened oil thus obtained (75 parts) was mixed with coconut oil (25 parts) to obtain the mixed hardened oil having the solid fat index determined by pulse NMR of 24.5 to 10° C., 11.0 at 20° C., 2.3 at 30° C. and 0.5 at 35° C.

Skimmed milk powder (8 parts) was mixed with the above-obtained the mixed hardened oil (12 parts), water (80 parts) and lecithin (0.012 part) and the mixture was homogenized and pasteurized at 70° C. for 30 minutes by using a homomixer. Further, the mixture was homogenized twice under the pressure of 100 kg/cm$^2$, cooled to 5° C. and then allowed to stand overnight in a refrigerator. The mixture was warmed to 22° C. and to the mixture were added a lactic bacillus starter (2 parts), rennet ($2.2 \times 10^{-6}$ part) and calcium chloride ($1.0 \times 10^{-6}$ part). The mixture was allowed to ferment at 21° C. until the pH of the mixture became 4.6 or less to form a curd. The curd was subjected to cooking and then cooled to 10° C. to separate and drain whey. The water content of the drained curd was about 56% by weight. An appropriate amount of salt and a stabilizer (locust bean gum) was added to the drained curd and the mixture was pasteurized with kneading at 65° C. for 15 minutes. Then, the mixture was ground to particles of 2 to 3μ in particle size by using a colloid mill and the particles were packed in a bag to obtain the desired cheese-like food.

EXAMPLES 2 TO 8 AND REFERENCE
EXAMPLE 1 TO 4

According to the same procedure as described in Example 1, cheese-like foods were made by using the fats and oils shown in Table 1.

TABLE 1

|  | Example Nos. | | | | | | | Reference Example Nos. | | | |
| --- | --- | --- | --- | --- | --- | --- | --- | --- | --- | --- | --- |
|  | 2 | 3 | 4 | 5 | 6 | 7 | 8 | 1 | 2 | 3 | 4 |
| Fats or Oils | | | | | | | | | | | |
| Hardened rapeseed oil | 100% | — | — | — | — | — | 100% | — | — | — | — |
| Mixed hardened oil of rapeseed oil (80 parts) and middle m.p. fraction of palm oil (20 parts, I.V. 67) | — | 100% | — | — | — | 100% | — | — | — | — | — |
| Mixed hardened oil of soy bean oil (60 parts) and middle m.p. fraction of palm oil (40 parts, I.V. 67) | — | — | 75% | — | — | — | — | — | — | — | 100% |
| Palm oil | — | — | — | 70% | — | — | — | 100% | — | — | — |
| Coconut oil | — | — | 25% | 30% | 60% | — | — | — | 100% | — | — |
| Tallow | — | — | — | — | 40% | — | — | — | — | 100% | — |
| Properties of fats or oils | | | | | | | | | | | |
| I.V. | 77.2 | 72.0 | 53.2 | 39.7 | 22.3 | 75.5 | 75.0 | 53.1 | 8.3 | 48.7 | 68.1 |
| m.p. (°C.) | 30.4 | 30.5 | 32.3 | 22.9 | 28.8 | 23.8 | 34.0 | 36.3 | 24.3 | 41.9 | 29.6 |
| Solid fat index by pulse NMR | | | | | | | | | | | |
| 10° C. | 49.0 | 30.5 | 28.5 | 34.5 | 42.5 | 20.1 | 52.1 | 36.0 | 54.0 | 32.5 | 28.0 |
| 20° C. | 29.8 | 24.0 | 13.7 | 14.0 | 20.0 | 12.0 | 44.7 | 27.0 | 32.5 | 24.2 | 15.5 |
| 30° C. | 8.5 | 8.5 | 5.5 | 5.5 | 6.8 | 1.2 | 14.7 | 10.0 | 0 | 18.7 | 7.5 |
| 35° C. | 5.0 | 2.5 | 0.5 | 4.2 | 4.0 | 0 | 7.3 | 6.0 | 0 | 13.0 | 1.0 |

Each cheese-like food thus obtained was subjected to an organoleptic flavor evaluation by using 10 panelists. When the cheese-like food had excellent flavor with no defect in flavor, each panelist gave 5 points to the cheese-like food. When the panelist detected a defect such as plain flavor, unpleasant flavor or the like, the panelist decreased the points to be given according to the degree of the defect. The total points given by the 10 panelists for each cheese-like food are shown in Table 2.

| Cheese-like foods | Total points |
| --- | --- |
| Example 1 | 49 |
| Example 3 | 50 |
| Example 4 | 46 |
| Example 5 | 46 |
| Example 6 | 42 |
| Example 7 | 40 |
| Example 8 | 40 |
| Reference Example 1 | 16 |
| Reference Example 2 | 10 |
| Reference Example 3 | 25 |
| Reference Example 4 | 22 |

As is seen from the above results, the points of the product of Examples 2 and 3 made by using rapeseed oil are very high and, apparently, they have excellent flavor with no defect. Although the points of the products of Examples 4 to ≠made by using the laurin fats or oils containing no rapeseed oil have somewhat low in comparison with those of Examples 2 and 3, they also have excellent flavor except that they have a little plain flavor. To the contrary, the points of the products of Reference Examples 1 to 4 are very low and their flavors are exceedingly plain or unpleasant. Particularly, flavor of the product of Reference Example 2 made by using coconut oil alone is very bad. Further, the texture of the product of Reference Example 2 is crumbly and is unsuitable for this kind of food. Besides, the product of Example 7 made by using the fat or oil, the fat index of which being near the lower limit thereof, is slightly oily. The product of Example 8 made by using the fat or oil, the solid fat index of which being near the upper limit thereof, has slightly inferior melting proterties in the mouth. It is considered that these products of Examples 7 and 8 are acceptable but reach the limit.

What is claimed is:

1. In a method of making an unripened cheese-like food comprising mixing a proteinaceous component and a fat or oil component, curdling the resulting mixture with a microorganism, an enzyme or a mixture of a microorganism and an enzyme to form a curd, cooking the curd to separate whey, draining the whey, adding salt, and then working up the resulting material and pasteurizing the unripened cheese-like food, the improvement which comprises using as the fat or oil component a fat or oil selected from the group consisting of
   (a) rapeseed oil,
   (b) a mixture of rapeseed oil and 5 to 50%, based on the weight of said mixture, of a laurin fat or oil which is a member selected from the group consisting of coconut oil, palm kernel oil, babassu oil and a mixture thereof,
   (c) a mixture of 30% by weight or more, based on the weight of the mixture, of rapeseed oil, 5 to 50% by weight, based on the weight of the mixture, of said laurin fat or oil and another edible fat or oil which is a member selected from the group consisting of soy bean oil, palm oil, tallow, lard, sheep fat, fish oil, whale oil, linseed oil, peanut oil, rice bran oil, safflower oil, sunflower oil, cottonseed oil, kapok oil, olive oil, shea butter, sal fat, illipe butter and a mixture thereof, and
   (d) a mixture of rapeseed oil and said other edible oil, said fat or oil having a solid fat index determined by a pulse nuclear magnetic resonance method of 20 to 55% at 10° C., 10 to 45% at 20° C., 25% or less at 30° C. and 10% or less at 35° C.

2. A method according to claim 1, wherein the mixture contains the laurin fat or oil in an amount of 10 to 30% by weight based on the mixture.

3. A method according to claim 1 in which the oil employee is rapeseed oil.

4. A method according to claim 1 in which the proteinaceous component is a member selected from the group consisting of whole milk, skimmed milk powder, milk powder, skimmed milk powder and mixtures thereof.

5. A method according to claim 1, wherein the fat or oil is a mixture of rapeseed oil and one or a plurality of other fats or oils selected from the group consisting of coconut oil, soy bean oil, palm oil, palm kernel oil, babassu oil and tallow.

6. A method according to claim 5, wherein the fat or oil is a mixture of rapeseed oil and one or a plurality of other fats or oils selected from the group consisting of coconut oil, soy bean oil and palm oil.

7. A method according to claim 5 or 6, wherein the mixture contains rapeseed oil in an amount of 50% by weight or more based on the mixture and the laurin fat or oil in an amount of 50% by weight or less based on the mixture.

* * * * *